June 22, 1965     W. H. BACON     3,190,417
OVER-RUNNING CLUTCH
Filed April 5, 1963
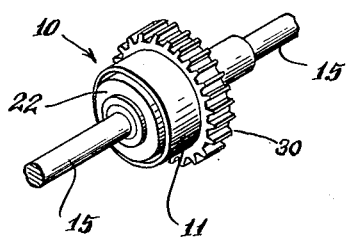
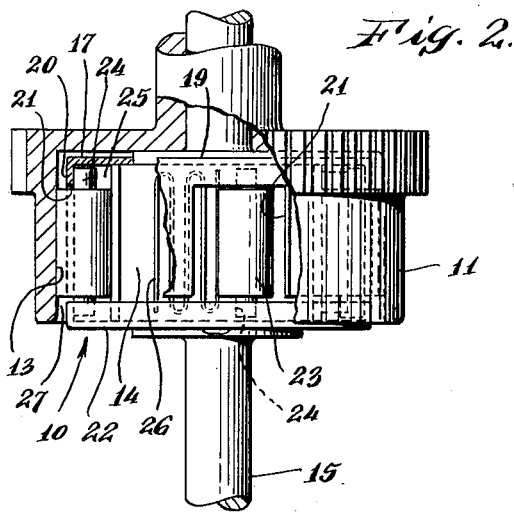
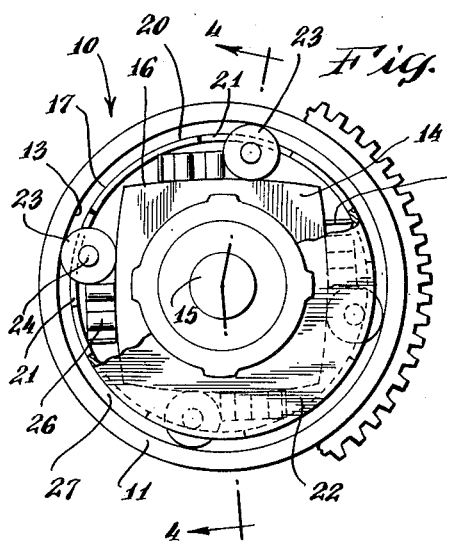
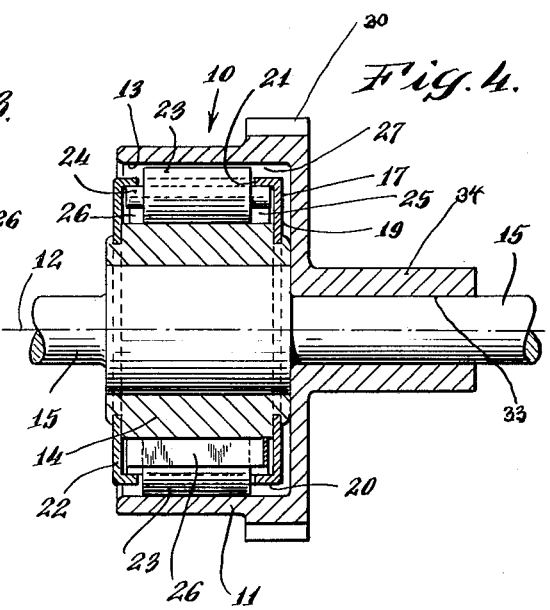
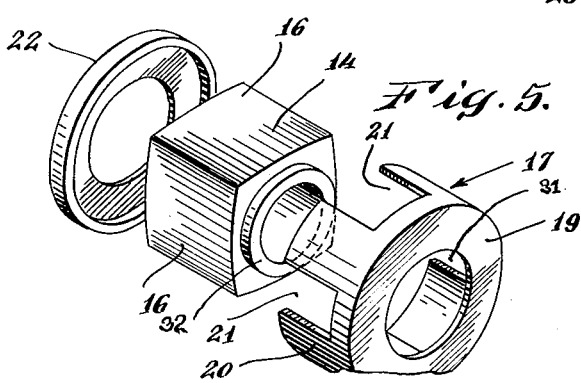
INVENTOR.
Walter H. Bacon
BY
Roy L. Parsell
ATTORNEY.

United States Patent Office 3,190,417
Patented June 22, 1965

3,190,417
OVER-RUNNING CLUTCH
Walter H. Bacon, 39 Dogwood Road,
North Haven, Conn.
Filed Apr. 5, 1963, Ser. No. 270,954
4 Claims. (Cl. 192—45)

This invention relates to a clutch and more particularly to an improved over-running clutch.

One of the objects of this invention is to provide an over-running clutch of simplified construction having few parts.

Another object is to provide an over-running clutch which can be pre-assembled as a unit and easily installed in the apparatus in which it is to operate.

Still another object is to provide a clutch of the type in which the driving direction can be conveniently reversed.

Yet another object is to provide a clutch in which the roller biasing means requires no special mounting means and engages the roller so as to advance it parallel to the axis of the clutch.

While another object is to enclose the rollers and cam surfaces in a dust resistant enclosure which is at the same time easily removable as a unit from the clutch or replaced therein.

Other objects and a fuller understanding of the invention may be had by referring to the following description and claims, taken in consideration with the accompanying drawings, in which:

FIGURE 1 is a perspective view of the assembled clutch incorporating the features of the present invention;

FIGURE 2 is an enlarged view with a portion broken away to show the interior structure;

FIGURE 3 is an end view of the clutch with one end of the cartridge removed;

FIGURE 4 is a sectional view taken on line 4—4 of FIGURE 3; and

FIGURE 5 is a schematic perspective view of a portion of the cartridge member with rollers and springs omitted.

With reference to the drawing, the clutch is denoted generally by the reference numeral 10. A cup shaped outer member 11 rotatable about the clutch axis 12, preferably on shaft 15, is journaled 33 in the hub portion 34 thereof. A gear 30 is also formed on the member 11 to connect with an outside source (not shown) to receive or transmit force as the conditions under which the clutch 10 may be used requires.

A cam 14 fixedly mounted on shaft 15 is provided with cam faces 16 parallel to the axis 12. Any suitable means may be used for fixing such as a key or set screw although a force fit is preferred. A cylindrical cartridge casing 17 having an end closing member 19 partly encloses the cam 14 with rectangular apertures 21 therein located opposite the cam faces 16. The end closing member 19 is provided with a central opening 31 which fits over a flange 32 on the end of the cam 14 to position the cartridge casing 17 in spaced relation to the cam 14 as shown clearly in FIGURES 3 and 5. The end closing member 17 is fixed to the cam 14 in any suitable manner preferably by staking. The enclosing of the cam 14 is completed by the end closure 22 secured to the other end of cam 14 in a similar manner to that of end closure 19.

It will be noted especially in FIGURE 3 that the space between the cam faces 16 and the inside of the cartridge casing 17 as well as the race 13 converges in both lateral directions.

Rollers 23 having axle portions 24 extending from each end thereof engage the cam faces 16 and have a cylindrical portion protruding through the apertures 21. Since the lateral width of the apertures 21 is somewhat greater than the portion of the roll protruding therethrough, these rollers 23 would tend to float laterally in the converging space between the cam faces 16 and the race 13 were it not for biasing springs 26 (see FIGURE 3). The springs 26 are supported on the cam faces 16 and exert expansive lateral force between the casing 17 and the rollers 23 to maintain the rollers 23 against the race 13.

The rollers 23 are retained in the casing 17 by means of the axle portions 24 approaching the cartridge end closure 19 and 22 and the portion 25 of the casing 17 between the ends of the aperture 21 and the respective end closures 19 and 22. The spring 26 (see FIGURE 2) is preferably made of flat stock in wave like formation with the crests guided by the end closures 19 and 22 and the slopes generally parallel to the axis 12. With these generally parallel slopes the expansive force always maintains the rollers parallel to the axis 12 and hence the cylindrical elements of the rollers 23 align with the cylindrical elements of the race 13 when the rollers 23 engage the race 13 due to the generally concentric relation of the race 13 and the axis 12.

Although the preferred embodiment of my improvement discloses rollers I may use balls instead particularly where there is a need for economy of axial space.

Since the crests of the springs 26 abut the end closures 19 and 22 the springs are maintained in position at all times without any special abutments or guide members and furthermore are retained within the cartridge casing 17 by the portion 25 of the casing between the ends of the apertures 21 and the ends 19 and 22 of the casing 17.

In the preferred construction the shaft 15 extends on either side beyond the cam 14 or the ends of cartridge casing 17 and is of the same diameter so that either extension will operate in the journal 33 of the outer member 11. Therefore when it is desired to operate the clutch 10 in an opposite direction all that is necessary is to withdraw the inner member or cartridge 17 and insert the opposite end in the journal 33 of the outer member 11.

The operation of my clutch can be understood most easily by referring to FIGURE 3. It will be noted that the rollers 23 are biased by springs 26 to occupy a position of engagement with both race 13 and cam faces 16 and if a counter clockwise driving force is applied to shaft 15, cam faces 16 will rotate counter clockwise and cause rollers 23 to wedge in driving engagement with race 13 and the outer member 11 will move therewith.

Conversely if the driving force is applied counter clockwise to the outer member 11, the rollers 23 will not wedge with the cam face 16 but will free themselves and there will be no driving force transmitted to the shaft 15 for counter clockwise rotation.

Also conversely if a clockwise driving force is applied to the outer member 11, then the rollers 23 will again be wedged and the clockwise driving force will be imparted to the cam faces 16 and the shaft 15 will rotate clockwise.

Again conversely if a clockwise driving force is applied to the shaft 15, the cam faces 16 will tend to free the rollers 23 and no movement will be imparted to the outer member 11.

Although the invention has been described in its preferred form with a certain degree of particularity, it is understood that the present disclosure of the preferred form has been made only by way of example and that numerous changes in the details of construction and arrangements of parts may be resorted to without departing from the spirit and scope of the invention as hereinafter claimed.

I claim as my invention:

1. In a clutch mechanism of the over-running type for coupling in driving engagement two rotatable companion parts when a driving force is applied to one of those parts one of which has a hollow cylinder portion having an open end with a race formed on the internal periphery of the cylinder portion to receive the other part which comprises a unitary cartridge, said cartridge comprising a cam member rotatable about a central axis, a hollow cylindrical casing having an open end and a closed end fixedly mounted at its said closed end adjacent one end of said cam member so that said casing is concentric with said axis, a closure member fixedly mounted adjacent the other end of said cam member and said casing with the periphery of said closure member being concentric with said axis and aligned with the peripheral surface of said casing whereby said cam member is substantially enclosed by said casing and said closure member, said casing provided with a plurality of circumferentially spaced apertures to receive a wedging roller, a plurality of cam surfaces on said cam member located opposite said apertures and forming laterally converging spaces with said casing respectively, a wedging roller received in each of said apertures having a diameter such that when said roller is reposing on said cam surface at the point of maximum radial height of said converging space said roller will not make driving engagement with such race when said cartridge is received in such cylinder portion, the lateral width of each said aperture being such as to permit said roller to make driving engagement with such race when said roller is moved laterally on said cam surface respectively when said cartridge is received in such cylinder portion and such driving force is applied to one of such parts, resilient biasing means guided by said closure member and said closed end and engaging said roller urging said roller against one edge of said aperture when said cartridge is not received in such cylinder portion and urging said roller into a position of driving engagement with such race when said cartridge is received in such cylinder portion respectively, and means for limiting the outward radial movement of said rollers.

2. In a clutch mechanism of the over-running type for coupling in driving engagement two rotatable companion parts when a driving force is applied to one of those parts one of which has a hollow cylinder portion having an open end with a race formed on the internal periphery of the cylinder portion to receive the other part which comprises a unitary cartridge, said cartridge comprising a cam member rotatable about a central axis, a hollow cylindrical casing having an open end and a closed end fixedly mounted at its closed end adjacent one end of said cam member so that said casing is concentric with said axis, a closure member fixedly mounted adjacent the other end of said cam member and said open end of said casing with the periphery of said closure member being concentric with said axis and aligned with the peripheral surface of said casing whereby said cam member is substantially enclosed by said casing and said closure member, said casing provided with a plurality of circumferentially spaced apertures each to receive a wedging roller, a plurality of cam surfaces on said cam member located opposite said apertures and forming laterally converging spaces with said casing respectively, a wedging roller received in each of said apertures having a diameter such that when said roller is reposing on said cam surface at the point of maximum radial height of said converging space said roller will not make driving engagement with such race when said cartridge is received in such cylinder portion, the lateral width of each said apertures being such as to permit said roller to make driving engagement with such race when said roller is moved laterally on said cam surface respectively when said cartridge is received in such cylinder portion and such driving force is applied to one of such parts, a biasing spring reposing on each said cam surface engaging said roller at one end of said spring and abutting said casing at its other end respectively urging said roller against one edge of said aperture when said cartridge is not received in such cylinder portion and urging said roller into a position of driving engagement with such race when said cartridge is received in such cylinder portion respectively and means for limiting the outward radial movement of said rollers.

3. In the cartridge of claim 2 said spring having a wave like formation of such amplitude as will permit the interior surfaces of the said closed end of said casing and said closure member respectively to act as guideways to retain said spring in operating biasing position engaging said roller for a substantial distance between the ends of said roller.

4. In a clutch mechanism of the over-running type for coupling in driving engagement two rotatable separable companion parts when a driving force is applied to one of those parts comprising a hollow cylinder portion having an open end, a race formed on the internal periphery of the said cylinder portion, a unitary cartridge received in said cylinder portion comprising a cam member rotatable about said central axis, a hollow cylindrical casing having an open end and a closed end fixedly mounted at its said closed end adjacent one end of said cam member so that said casing is concentric with said axis, a closure member fixedly mounted adjacent the other end of said cam member and said casing with the periphery of said closure member being concentric with said axis and aligned with the peripheral surface of said casing whereby said cam member is substantially enclosed by said casing and said closure member, said casing provided with circumferentially spaced apertures to receive a wedging roller, a plurality of cam surfaces on said cam member located opposite said apertures and forming laterally converging spaces with said casing respectively, a wedging roller received in each of said apertures having a diameter such that when said roller is reposing on said cam surface at the point of maximum radial height of said converging space said roller will not make driving engagement with said race when said cartridge is received in said cylinder portion, the lateral width of each of said apertures being such as to permit said roller to make driving engagement with said race when said roller is moved laterally on said cam surface respectively when said cartridge is received in said cylinder portion and such driving force is applied to said cylinder portion or said cartridge, a biasing spring reposing on each said cam surface engaging said roller at one end of said spring and abutting said casing at the other end of said spring respectively urging said roller into position of driving engagement with said race when said cartridge is received in said cylinder portion and against one edge of said aperture respectively when said cartridge is not received in said cylinder portion, said spring having a wave like formation of such amplitude as will permit the interior surfaces of the said closed end of said casing and said closure member respectively to act as guideways to retain said spring in operating biasing position engaging said roller for a substantial distance between the ends of said roller, means for limiting the outward radial movement of said rollers respectively and means for mounting said cylinder portion and said cartridge in respective coupling engagement one with the other.

References Cited by the Examiner

UNITED STATES PATENTS

| | | | |
|---|---|---|---|
| 1,106,605 | 8/14 | Waterous | 192—44 |
| 1,927,046 | 9/33 | Powell | 192—44 |
| 2,051,385 | 8/36 | Murray | 192—44 |
| 2,172,653 | 9/39 | Flogous | 192—45 |
| 2,633,951 | 4/53 | Ayer et al. | 192—45 |
| 2,705,552 | 4/55 | Cross et al. | 192—45 |
| 2,815,838 | 12/57 | Dodge | 192—45 |
| 2,827,991 | 3/58 | Bradway | 192—44 |
| 2,843,238 | 7/58 | Rozner | 192—45 |
| 3,084,774 | 4/63 | Po-Lung Liang | 192—44 |
| 3,123,169 | 3/64 | Young et al. | 192—44 |

DAVID J. WILLIAMOWSKY, *Primary Examiner.*